March 10, 1959

L. A. IDDINGS 2,877,356

OPTICAL CONTROL SYSTEM

Filed May 31, 1957

INVENTOR.
LLOYD A. IDDINGS

BY

H. W. Losche
ATTORNEYS

United States Patent Office 2,877,356
Patented Mar. 10, 1959

2,877,356

OPTICAL CONTROL SYSTEM

Lloyd A. Iddings, Arlington, Va.

Application May 31, 1957, Serial No. 662,955

6 Claims. (Cl. 250—214)

(Granted under Title 35, U. S. Code (1952), sec. 266)

The invention described herein may be manufactured and used by or for the Government of the United States of America for governmental purposes without the payment of any royalties thereon or therefor.

The present invention relates to a system for remotely measuring changes in position of an element, and more particularly to a system for measuring changes in position of an element by both frequency and intensity of a signal.

It is often desirable to measure the rotation or deflection of a device without placing additional load or drag on the device. One commonly used method employed in the past comprised using a light source, a disk having a variable width slot, and a photocell. The disk, when rotated to various positions, permitted different quantities of light to be passed to the photocell and thus indicated the angular measurement of a shaft or element on which the disk was attached. However, this method of measuring rotation or deflection can be employed when there is only one axis of rotation involved and thus the method is limited in operation.

The present invention, by employing a novel system of using both frequency and intensity of a signal, readily lends itself for use with devices having more than one axis of rotation, such as gyroscopes, and can measure the changes and take corrective action if desired. In the present invention, a collimated beam of light is projected onto a gyroscope mirror which reflects the beam through a chopping system to a photocell. The chopping system is comprised of two disks, each having two bands, which provides four areas, each having a different combination of slots. The frequency of the light pulse reaching the photocell depends upon the particular area that the light is passing through. Either by making the width of the particular slots variable or by controlling the transparency of the slots, the light passing through the various combinations of slots is also given magnitude; that is, the intensity of the light beam can be controlled as the beam moves toward the periphery of a band. The frequency of the pulse reaching the photocell depends upon the particular area that the beam is passing through, and the magnitude or intensity of the light beam depends upon the particular location of the point that the beam is passing through.

It is therefore a general object of the present invention to provide means for remotely measuring changes in position of a sensing element without placing a drag load on said element.

Another object of the present invention is to provide means for measuring the position of a sensing element that is rotatable about more than one axis.

Other objects and advantages of this invention will be readily appreciated as the same becomes better understood by reference to the following detailed description when considered in connection with the accompanying drawing wherein.

Figure 1:
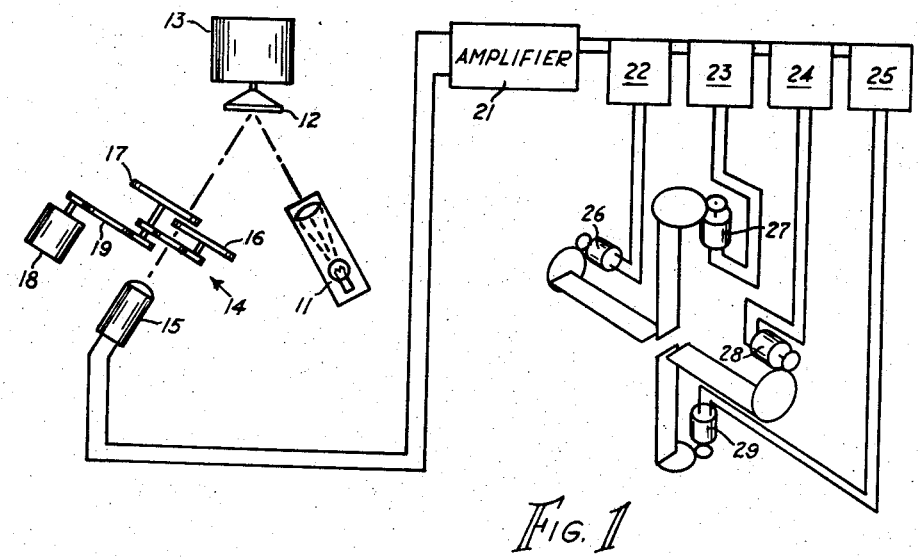
Figure 1 is a diagrammatic view showing a system embodying the present invention.

Referring now to the drawing, there is shown, in Figure 1, a system employing the principles of the present invention. A collimated beam of light is provided by a light source 11 and is focused upon a rotatable mirror 12 that is attached to a gyroscope 13. The mirror 12 and gyroscope 13 arrangement might be of any well known design, and, by way of example, might be of the type shown in Figures 2–5 of United States Patent 2,527,245.

Figure 2:
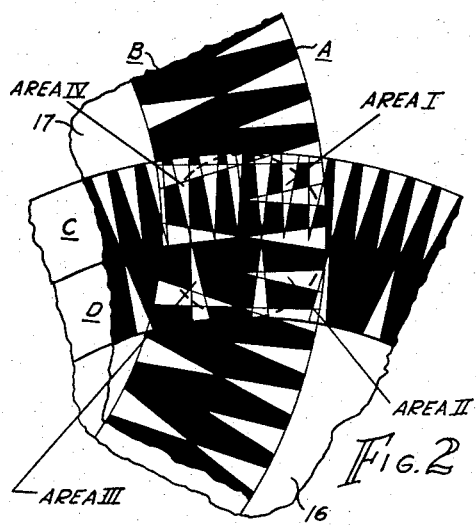
Figure 2 is a view showing one embodiment of a chopper device.

The beam of light is reflected from the mirror 12 through a chopper assembly 14 into a photocell 15. The chopper assembly 14 is comprised of two disks 16 and 17 that are rotatably driven at a synchronous speed by a motor 18 through a suitable gear train 19. Referring particularly to Figure 2 of the drawing, it can be seen that disks 16 and 17 each have two bands, and that the center of disk 16 is positioned such that the bands thereon transversely intersect the bands on disk 17. By way of example, disks 16 and 17 might be made of a transparent plastic material and the bands thereon made by using an opaque masking material to form the desired pattern. Also the disks could be of opaque material, such as aluminum, steel, or the like, and have slots therein through which light can pass.

As shown in Figure 2 of the drawing, the segments of bands A, B, C, and D, through which light can pass, are of different sizes, and furthermore the areas are triangular in shape. Thus it can be seen that four areas are formed by the overlapping bands, namely area I, formed by bands A and C; area II, formed by bands A and D; area III, formed by bands B and D; and area IV, formed by bands B and C. When the beam of light is reflected from the mirror 12, it will pass through point "P," which is a common point to all four of the bands. However, when the mirror 12 is pivoted by the gyroscope, the beam of light will be reflected into one of the four areas and will be "chopped" or interrupted by the bands. The frequency of the light pulse reaching the photocell 15 depends upon the particular area that the light is passing through, and it can readily be seen that by providing different slot widths in the various bands a different frequency is obtainable for each area.

As shown in Figure 1 of the drawing, the photocell 15 transmits the frequency of the chopped light as electrical energy to an amplifier 21, which amplifies the energy and passes it on to four discriminators 22–25, inclusive. Each discriminator is tuned to one of the four frequencies of the four areas of the chopper assembly 14. By way of example, Figure 1 shows each discriminator controlling an electrical motor (items 26–29, inclusive) that positions the control surfaces of a rocket. The amplifier 21 and discriminators 22–25, inclusive, may be of any suitable type, such as an electronic amplifier and C—R discriminators, the details of construction of which are well known to those skilled in the art.

It can be seen, in Figure 2 of the drawing, that the openings in the disks 16 and 17 through which the light beam passes are triangular in shape with the vertexes passing through the imaginary point "P" as the disks are rotated. As the mirror 12 is pivoted by the gyroscope 13, the point through which the reflected beam of light will pass through the disks is moved from point "P" to the outer periphery of the bands, and, although the frequency of interruption of the light is the same within any one particular area, it can be seen that the time duration of the light will be increased. Thus a variation in intensity is provided and this can be measured with the discriminators shown in Figure 1 of the drawing. It should therefore be clear that by having the triangular shaped openings a system such as the one shown in Figure 1 of the drawing will first indicate what quadrant or area the light beam is passing through and will further indicate the position in the area through which the beam of light is passing.

Figure 3:
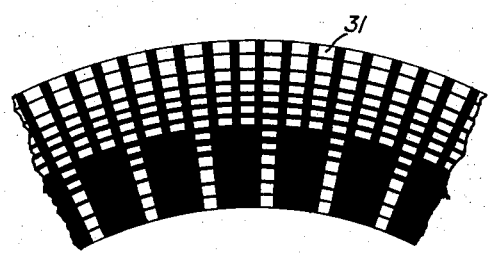
Figures 3 and 4 are views showing other embodiments of a chopper device.

In Figure 3 of the drawing there is shown a different embodiment of the chopper disks wherein the slots 31 through which the light beam may pass have variable degrees of translucence, with the least amount of light being passable at the inner edge of the bands and the greatest amount of light being passable at the outer periphery of the bands. It can be seen that this type of disk will give the same kind of control as the variable width slot as the amount of light reaching the photocell 15 will be proportional to the distance from the inner edge of the bands to the point where the light beam passes through the slot.

Figure 4:
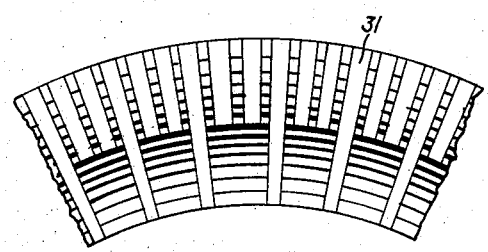

In Figure 4 of the drawing another embodiment of a chopper disk is shown. In this embodiment, the slots 31, through which the light beam can pass, are transparent and the space between slots 31, which normally would be opaque, is a shaded filter getting gradually darker toward the outer periphery of the bands. This type of disk functions the same as the embodiment shown in Figure 3 of the drawing in that the amount of light reaching the photocell 15 will be proportional to the distance from the inner edge of the bands to the point where the light beam passes through the disks.

Figure 5:
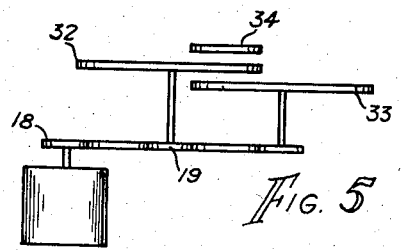
Figure 5 is a view showing still another embodiment of a chopper device having a filter arrangement.

Referring now to Figure 5 of the drawing, there is shown still another embodiment of a chopper assembly wherein disks 32 and 33 have slots therein similar to the slots in Figure 4 of the drawing, with the area adjacent the slots being opaque. The intensity of the light passing through the slots is controlled by a filter 34 that has variable degrees of translucence with the least amount of light being passable at the center of the filter 34 and the greatest amount of light being passable at the outer periphery of the filter.

Obviously many modifications and variations of the present invention are possible in the light of the above teachings. It is therefore to be understood that the invention may be practiced otherwise than as specifically described.

I claim:

1. A system for measuring changes in position of a member having pivotal movement comprising: a light source for emitting a beam of light; means on said member having pivotal movement for reflecting said beam of light; a chopping system having first and second rotating disks, each of said disks having first and second adjacent circular bands thereon with means for varying the quantity of light transmitted therethrough, a single photocell for receiving the light transmitted through said chopping system, and a plurality of discriminators connected to the output of said single photocell for measuring the amount of change in position of said member having pivotal movement.

2. A system for measuring changes in position of a member having pivotal movement as set forth in claim 1 wherein said means for varying the quantity of light transmitted through said disks comprises a plurality of variable width slots in each of said circular bands.

3. A system for measuring changes in position of a member having pivotal movement as set forth in claim 1 wherein said means for varying the quantity of light transmitted through said disks comprises a plurality of translucent openings in said disks, said openings having variable degrees of translucence with the least amount of light being passable at the inner edge of said bands and the greatest amount of light being passable at the outer periphery of said bands.

4. A system for measuring changes in position of a member having pivotal movement as set forth in claim 1 wherein said means for varying the quantity of light transmitted through said disks comprises a plurality of transparent openings in said disks with the area adjacent said openings having variable degrees of translucence with the least amount of light being passable at the inner edge of said bands and the greatest amount of light being passable at the outer periphery of said bands.

5. A system for measuring changes in position of a member having pivotal movement comprising: a light source for emitting a beam of light; means on said member having pivotal movement for reflecting said beam of light; a first rotating disk having first and second adjacent circular frequency bands comprised of a plurality of variable width slots; a second rotating disk having first and second adjacent circular frequency bands comprised of a plurality of variable width slots and different from the frequency bands on said first disk; said first and second rotating disks being positioned such that said beam of light is intersected by both said disks thereby forming four frequency areas through which said beam can pass; a single photocell for receiving the light transmitted through said chopping system; and a plurality of discriminators connected to the output of said single photocell for measuring the amount of change in position of said member having pivotal movement.

6. A system for measuring changes in position of a member having pivotal movement comprising: a light source for emitting a beam of light; means on said member having pivotal movement for reflecting said beam of light; a first rotating disk having first and second adjacent circular frequency bands comprised of a plurality of slots; a second rotating disk having first and second adjacent circular frequency bands comprised of a plurality of slots and different from the frequency bands on said first disk, said first and second rotating disks being positioned such that said beam of light is intersected by both said disks thereby forming four frequency areas through which said beam can pass; an annular filter intersecting said beam, said filter having variable degrees of translucence with the least amount of light being passable at the center of the filter and the greatest amount of light being passable at the outer periphery of said filter; a single photocell for receiving the light transmitted through said disks and said filter; and a plurality of discriminators connected to the output of said photocell for measuring the amount of change in position of said member having pivotal movement.

References Cited in the file of this patent

UNITED STATES PATENTS

| | | |
|---|---|---|
| 1,719,756 | Clay | July 2, 1929 |
| 1,880,105 | Reifel | Sept. 27, 1932 |
| 2,424,193 | Rost | July 15, 1947 |
| 2,431,510 | Salinger | Nov. 25, 1947 |
| 2,462,925 | Varian | Mar. 1, 1949 |
| 2,576,760 | Jones | Nov. 27, 1951 |
| 2,604,528 | Obermaier | July 22, 1952 |
| 2,643,457 | Skalka | June 30, 1953 |